United States Patent [19]

Morishita et al.

[11] Patent Number: 5,216,217
[45] Date of Patent: Jun. 1, 1993

[54] WIRECUT ELECTRICAL DISCHARGE MACHINE

[75] Inventors: Hiroaki Morishita; Yutaka Terada; Kazuo Tsurumoto; Akiyasu Ito, all of Aichi, Japan

[73] Assignee: Mitsubishi Denki K.K., Tokyo, Japan

[21] Appl. No.: 821,808

[22] Filed: Jan. 17, 1992

[30] Foreign Application Priority Data

Jan. 17, 1992 [JP] Japan .................................. 3-003637

[51] Int. Cl.⁵ .............................................. B23H 7/10
[52] U.S. Cl. .............................. 219/69.12; 242/75.44
[58] Field of Search ............... 219/69.12, 69.13, 69.17; 226/42, 95; 242/75.4, 75.43, 75.44, 45

[56] References Cited

U.S. PATENT DOCUMENTS 3,781,490 12/1973 Phillips ................................ 242/75.5
4,298,781 11/1981 Inoue .................................. 219/69.12

FOREIGN PATENT DOCUMENTS 59-149259  8/1984  Japan ................................. 242/75.44
61-226468 10/1986  Japan ................................. 242/75.44
63-256316 10/1988  Japan ................................. 219/69.12
2-152726   6/1990  Japan ................................. 219/69.12
2-185321   7/1990  Japan ................................. 219/69.12

Primary Examiner—Geoffrey S. Evans
Attorney, Agent, or Firm—Sughrue, Mion, Zinn, Macpeak & Seas

[57] ABSTRACT

Accurate control of the tension of a wire electrode in a wirecut electrical discharge machine is achieved by eliminating a direct-current (DC) component from a speed difference signal between a braking section and a recovery section of the machine. The DC component of the speed signal which is eliminated is associated with the stretching of the wire electrode while under tension. As a result, the tension can be maintained constant dynamically as well as statically, thereby improving machining accuracy.

20 Claims, 5 Drawing Sheets

WIRECUT ELECTRICAL DISCHARGE MACHINE

BACKGROUND OF THE INVENTION

The present invention relates to a device for accurately controlling the tension of a wire electrode in a wirecut electrical discharge machine.

FIG. 1 illustrates a wire electrode driving system for a conventional wirecut electrical discharge machine. As illustrated in FIG. 1, the conventional wirecut electrical discharge machine includes numerous parts, namely, a workpiece 1, a wire electrode 2 for machining the workpiece 1, a wire bobbin 3 where the wire electrode 2 is spooled, a torque motor 4 attached to the shaft of the wire bobbin 3, brake rollers 5a and 5b for applying tension on the wire electrode 2, a brake motor 6 directly connected with the brake roller 5a, a tachometer 7 for detecting the speed of the brake motor 6, an upper pulley 8 for supporting the wire electrode 2 above the workpiece 1 and changing the running direction thereof, a lower pulley 9 for supporting the wire electrode 2 under the workpiece 1 and changing the running direction thereof, wire electrode pinch roller 10a and take up roller 10b for driving the wire electrode 2, a constant-speed motor 11 directly connected with the wire electrode pinch roller 10a, an NC unit 12 for providing tension and running speed command values for the wire electrode 2, a comparator 13 for comparing the tachometer 7 output and the running speed command value provided by the NC unit 12, an amplifier 14 for matching the characteristic value of the tachometer 7 output and that of the running speed command value provided by the NC unit 12, and a compensator 15 for compensating for the tension command value provided by the NC unit 12 in accordance with the output of the comparator 13.

The operation of the conventional wirecut electrical discharge machine illustrated in FIG. 1 will now be described.

The wire electrode 2, which is spooled off the wire bobbin 3, is fed through a gap between the pair of brake rollers 5a and 5b where tension is applied. The running direction of the wire electrode 2 is then changed by the upper pulley 8 which is located above the workpiece 1. As a result, the wire electrode 2 is supplied to a machining area where the workpiece 1 can be machined. The running direction is again changed by the lower pulley 9 placed under the workpiece 1. Finally, the wire electrode 2 is wound around pinch roller 10a and take up roller 10b to pull the wire electrode 2 through the machine.

The wire bobbin 3 is driven by the torque motor 4 to apply tension of about 200 grams to the wire electrode 2 so that the wire electrode 2 does not slack between the wire bobbin 3 and the brake rollers 5a and 5b. The brake roller 5a is furnished with the brake motor 6 to provide tension on the wire electrode 2 in the machine. The brake roller 5a is coupled to the brake motor 6 which controls the torgue with which the brake roller 5a moves in accordance with the tension command value provided by the NC unit 12.

The speed of the wire electrode 2 through the brake rollers 5a and 5b is detected as a voltage by the tachometer 7 installed on the brake motor 6. The voltage detected by the tachometer 7 includes an alternating-current (AC) component and a direct-current (DC) component. The output of the tachometer 7 is compared by the comparator 13 with the speed command value for the wire electrode 2 given by the NC unit 12, provided that the output of the tachometer 7 is compensated by the amplifier 14 in order to match the characteristic of the particular tachometer 7 output with that of the running speed command value provided by the NC unit 12. The output of the comparator 13 and the tension command value provided by the NC unit 12 are operated on by the compensator 15.

The pinch roller 10a is coupled to the constant-speed motor 11. The speed of the constant-speed motor 11 determines the running speed of the wire electrode 2 through the machine in accordance with the running speed command value provided by the NC unit 12.

The conventional wirecut electrical discharge machine is configured to keep the tension of the wire electrode 2 stable relative to dynamically varying tension (an AC component). The dynamically varying tension is, for example, a tension variation caused by the natural frequency of the wire system due to a disturbance, such as a machining counterforce.

When the tension variation (AC component) causes the wire recovery speed through the pinch roller 10a and take up roller 10b to be higher than the speed of the wire electrode 2 through the brake rollers 5a and 5b, the tension of the wire electrode 2 increases. Consequently, the comparator 13 outputs a positive signal, and the compensator 15 functions to reduce the tension. On the other hand, when the tension variation causes the recovery speed of the wire electrode 2 at the pinch roller 10a and take up roller 10b to be lower than the speed of the wire electrode 2 at the brake rollers 5a and 5b, the tension of the wire electrode system is decreased and the comparator 13 gives a negative signal so that the compensator 15 operates to raise the tension. Thus, the dynamically varying tension is controlled to be constant.

In the conventional wirecut electrical discharge machine configured as described above, the tension of the wire electrode 2 changes if a difference is produced between the running speed of the wire electrode 2 through the brake rollers 5a and 5b and the speed command value from the NC unit 12. However, the conventional machine cannot completely eliminate statically varying tension (the DC component) which occurs when the wire electrode stretches. For example, when tension is applied to the wire electrode 2, the wire electrode 2 stretches, causing the running speed of the wire electrode 2 at the brake rollers 5a and 5b to be lower than that at the pinch roller 10a and take up roller 10b. For this reason, the DC component of a voltage difference equivalent to the running speed difference is generated in the comparator 13. As a result, the compensator 15 undesirably operates to reduce the tension in accordance with the DC component.

In addition, if the generated voltage characteristic is not proportionate to the tachometer speed, a difference occurs between the voltage provided by the tachometer and the speed command value for the wire electrode, which changes the tension of the wire electrode. Further, if the tachometer output characteristic is not matched extremely accurately with the running speed command value, a DC component of the voltage difference is produced in the comparator 13 and changes the set tension of the wire electrode 2, leading to difficulty in the adjustment of the amplifier.

The running performance of the wire electrode 2 employed for machining the workpiece in the wirecut electrical discharge machine has great influence on machining accuracy, and in particular, the tension of the wire electrode 2 is an essential factor in determining the running performance. Further, to enhance the straightness of the wire electrode, the tension of the wire electrode is ordinarily set to a slightly higher value, to the extent that the wire electrode will not be broken. Therefore, if the tension of the wire electrode running system falls below the set value, problems will arise, e.g., the desired machining accuracy cannot be achieved. Conversely, if the tension of the wire electrode running system rises above the set value, the wire electrode will be broken or other problems may occur.

SUMMARY OF THE INVENTION

Accordingly, an object of the present invention is to overcome the disadvantages of the prior art by providing a wirecut electrical discharge machine which allows the o tension of a wire electrode to be kept constant dynamically as well as statically.

Accurate control of the tension of a wire electrode in a wirecut electrical discharge machine can be achieved by eliminating a direct-current component of a speed difference signal between a braking section and a recovery section of the machine. The direct-current component of the speed signal which is eliminated is associated with the stretching of the wire electrode while under tension. The tension can be maintained constant by compensating the tension command signal in response to an alternating-current component of the speed signal.

One embodiment of the present invention, which achieves the above and other objects and advantages, relates to a wirecut electrical discharge machine, which includes a control unit for supplying a tension command and a wire electrode speed command; a tension applying unit for applying tension on a wire electrode in accordance with the tension command from the control unit; a speed detecting unit for detecting speed of the wire electrode at the tension applying unit; a comparing unit for comparing the wire electrode speed command from the control unit with the output of the speed detecting unit; and a stretch compensation unit for compensating the tension command from the control unit based on an alternating-current component of the first comparison result. The stretch compensating unit may include a removing unit for removing a direct-current component of the output of the comparing unit, and a compensating unit for compensating the tension command from the control unit in accordance with the output of the removing unit.

Another embodiment of the present invention, which achieves the above and other objects and advantages, relates to a wirecut electric discharge apparatus, which includes a control unit for supplying a tension command and a wire electrode speed command; a tension unit for applying tension on a wire electrode based on the tension command from the control means; a first speed detection unit for detecting speed of the wire electrode at the tension unit; a pull unit for pulling the wire electrode based on the wire electrode speed command from the control unit; a second speed detection unit for detecting speed of the wire electrode at the pull unit; a first comparison unit for comparing the speed of the wire electrode output from the second speed detection unit with the speed of the wire electrode at the tension unit output from the first speed detection unit to produce a first comparison result; and a stretch compensation unit for compensating the tension command from the control unit based on an alternating-current component of the first comparison result. The stretch compensation unit may include an adjustment unit for removing a direct-current component of the first comparison result output of the first comparison unit to produce an adjusted comparison result, and a compensation unit for compensating the tension command from the control means for the tension applying means based on the modified comparison result of the removing means.

BRIEF DESCRIPTION OF THE DRAWINGS

The invention will be more clearly understood from the following detailed description in conjunction with the accompanying drawings, wherein.

DETAILED DESCRIPTION OF THE PREFERRED EMBODIMENTS

Several illustrative embodiments of the present invention will now be described with reference to the drawings.

Figure 1:
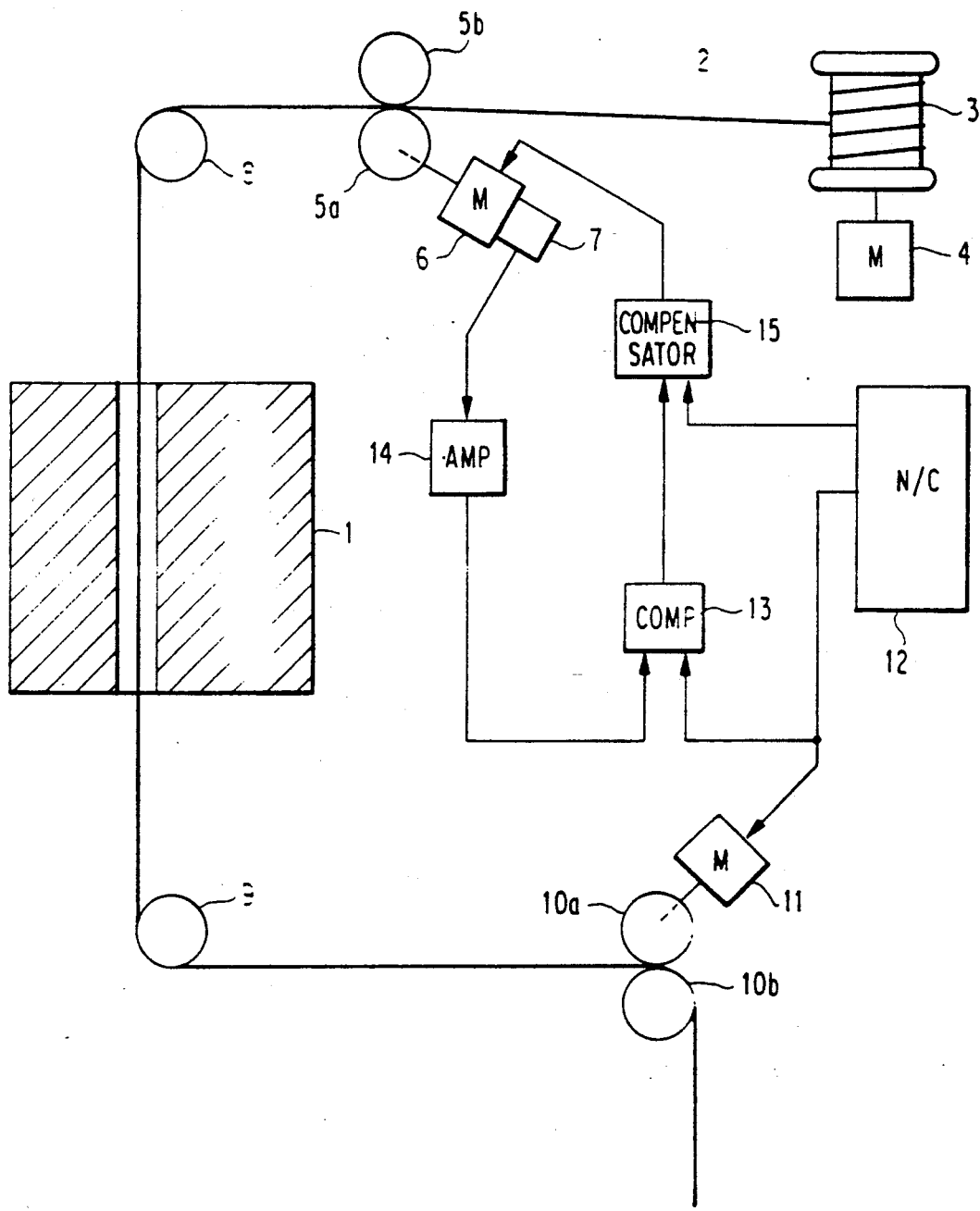
FIG. 1 is a diagram illustrating a conventional wirecut electrical discharge machine.
Figure 2:
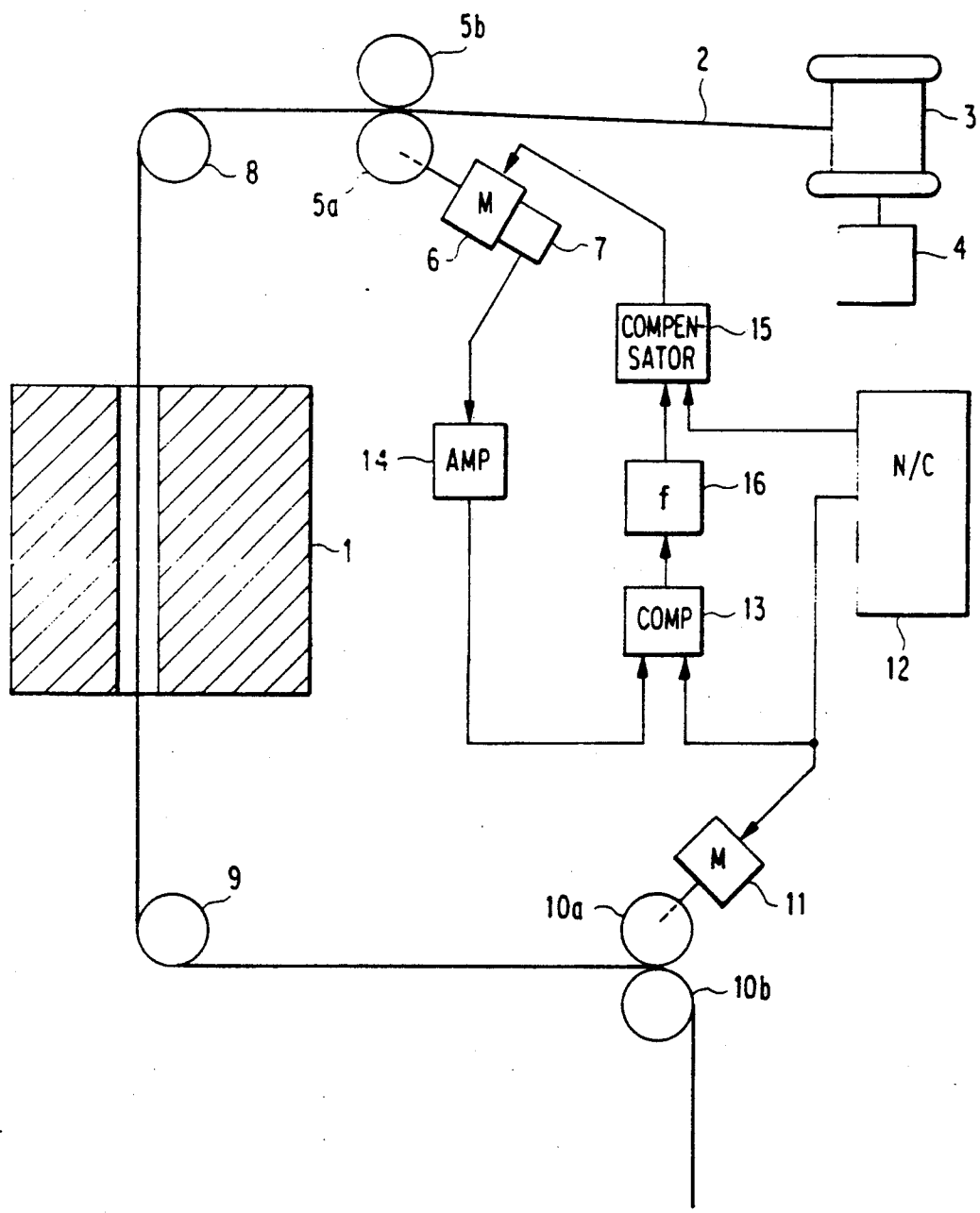
FIG. 2 is a diagram of a wirecut electrical discharge machine according to a first embodiment of the present invention.

FIG. 2 illustrates a wirecut electrical discharge machine according to a first embodiment of the present invention. Referring to FIG. 2, the elements of the wirecut electrical discharge machine are shown, namely, a workpiece 1, a wire electrode 2 for machining the workpiece 1, a wire bobbin 3 around which the wire electrode 2 is spooled, a torque motor 4 mounted on the shaft of the wire bobbin 3, brake rollers 5a and 5b for applying tension on the wire electrode 2, a brake motor 6 directly connected with the brake roller 5a, a tachometer 7 for detecting the speed of the brake motor 6, an upper pulley 8 for supporting the wire electrode 2 above the workpiece 1 and changing the running direction thereof, a lower pulley 9 for supporting the wire electrode 2 under the workpiece 1 and changing the running direction thereof, wire electrode pinch roller 10a and take up roller 10b for running the wire electrode 2, a constant-speed motor 11 directly connected with the wire electrode pinch roller 10a, a numerical control unit 12 (hereinafter "NC unit") for providing tension and running speed command values for the wire electrode 2, a comparator 13 for comparing the output of the tachometer 7 and the speed command value of the wire electrode 2 provided by the NC unit 12, an amplifier 14 for matching the characteristic of the output the tachometer 7 and that of the speed command value for the wire electrode 2 provided by the NC unit 12, a compensator 15 for compensating for the tension command value for the wire electrode 2 provided by the NC unit 12 in accordance with the output of the comparator 13, and a filter 16 for removing a direct-current (DC) component from the output of the comparator 13.

The operation of the wirecut electrical discharge machine configured as described above according to the first embodiment of the present invention will now be described.

The wire electrode 2, which is spooled off the wire bobbin 3, passes between the pair of brake rollers 5a and 5b where tension is applied. The brake rollers 5a and 5b together with the brake motor 6 form a braking section of the machine. The braking section applies tension to the wire electrode 2.

After passing through the brake rollers 5a and 5b, the running direction of the wire electrode 2 is then changed by the upper pulley 8 which is placed above the workpiece 1. As a result, the wire electrode 2 is supplied to a machining area where the workpiece 1 can be machined. The running direction is again changed by the lower pulley 9 placed under the workpiece 1. Finally, the wire electrode 2 is wound around pinch roller 10a and take up roller 10b which act to pull the wire electrode 2 through the machine. The pinch roller 10a and take up roller 10b, together with the constant-speed motor 11, form a wire receiving section.

The wire bobbin 3 is coupled to the torque motor 4 to apply tension of approximately 200 grams on the wire electrode 2 so that the wire electrode 2 does not slack between the wire bobbin 3 and the brake rollers 5a and 5b. The brake roller 5a is coupled to the brake motor 6 to apply tension to the wire electrode 2 in the machine. The brake motor 6 controls the torque with which the brake roller 5a moves in accordance with the tension command value provided by the NC unit 12.

The pinch roller 10a is coupled to the constant-speed motor 11. The speed of the constant-speed motor 11 determines the running speed of the wire electrode 2 through the machine in accordance with the running speed command value provided by the NC unit 12, e.g., a voltage level applied to the constant-speed motor 11.

The speed of the wire electrode 2 through the braking section is detected as a voltage by the tachometer 7 which is coupled to the brake motor 6. The output of the tachometer 7, which includes AC and DC components, is compared by the comparator 13 with the running speed command value of the wire electrode 2 provided by the NC unit 12. The output of the comparator 13 passes through the filter 16 where its DC component is removed. The compensator 15 then compensates the tension command value for the wire electrode 2 in accordance with the output of the filter 16.

Accordingly, the dynamically varying tension can thereafter be controlled in a conventional manner. The error of the speed difference signal of the comparator 13 produced statically is removed by the filter 16. For example, when tension is applied on the wire electrode 2, the wire electrode 2 stretches, causing a difference between the running speed of the wire electrode 2 in the braking section and that of the wire electrode 2 in the wire recovery section, and then generating the DC component of a voltage equivalent to the difference in the comparator 13. However, since the DC component is removed by the filter 16, the set tension of the wire electrode 2 remains unchanged. In addition, the set tension of the wire electrode 2 remains the same if there is a difference between the output characteristic of the tachometer 7 and the running speed command value for the wire electrode 2. Further, the amplifier 14 can also be easily adjusted such that it matches the characteristics of the running speed command value provided by the NC unit 12.

Figure 3:
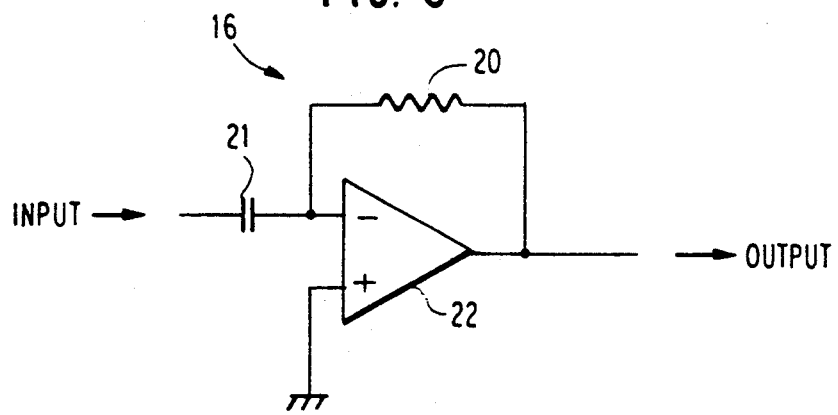
FIG. 3 is a schematic diagram illustrating an embodiment of, the filter 16.

FIG. 3 illustrates an embodiment of the filter 16. The filter 16 illustrated in FIG. 3 is a high-pass filter which includes a resistor 20, a capacitor 21, and an operational amplifier 22.

Figure 4:
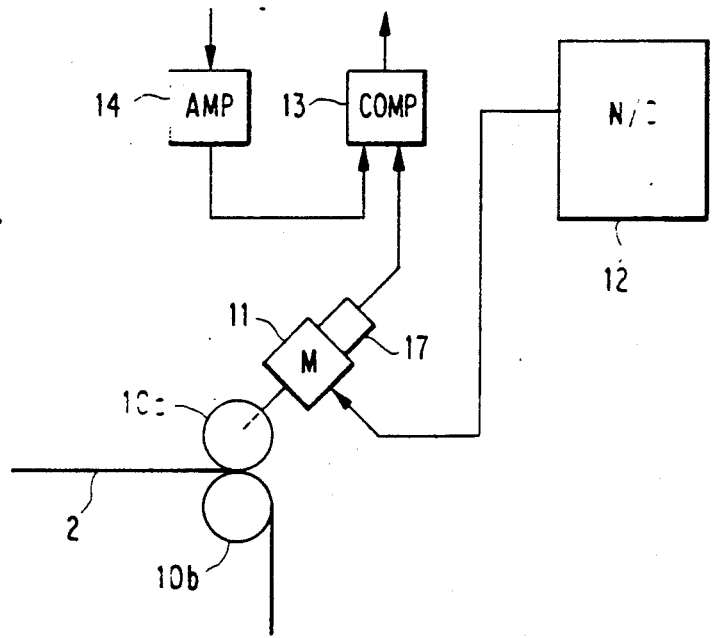
FIG. 4 is a diagram illustrating a second embodiment of the present invention.

FIG. 4 is a diagram illustrating a second embodiment of the present invention. The second embodiment operates the same as the first embodiment except that the speed of the wire electrode 2 through the wire recovery section is detected directly with a tachometer 17. The tachometer 17 is mounted on the shaft end of the constant-speed motor 11. Further, the speed of the wire electrode 2 detected by the tachometer 17 is used in the comparator 13 instead of the running speed command value from the NC unit 12.

It will be appreciated that the filter 16 is not limited to the high-pass filter illustrated in FIG. 3, but may be any device that reduces gain in the low-frequency range, e.g., a phase lead compensating circuit or a band-pass filter.

It will also be recognized that the brake motor 6 of the braking section which is utilized to apply tension may be a DC motor, an AC motor or other braking device. Moreover, the tachometer 7 employed for detecting the speed of the wire electrode 2 through the braking section may be replaced by an encoder and the output of the encoder may be converted from a frequency to a voltage, thus producing a similar effect. Furthermore, whereas the speed of the wire electrode 2 in the braking section is detected through the direct connection of the brake roller 5a and the brake motor 6, the speed of the wire electrode 2 may be detected by any other method if that speed is detected in the vicinity of the braking section.

Figure 5:
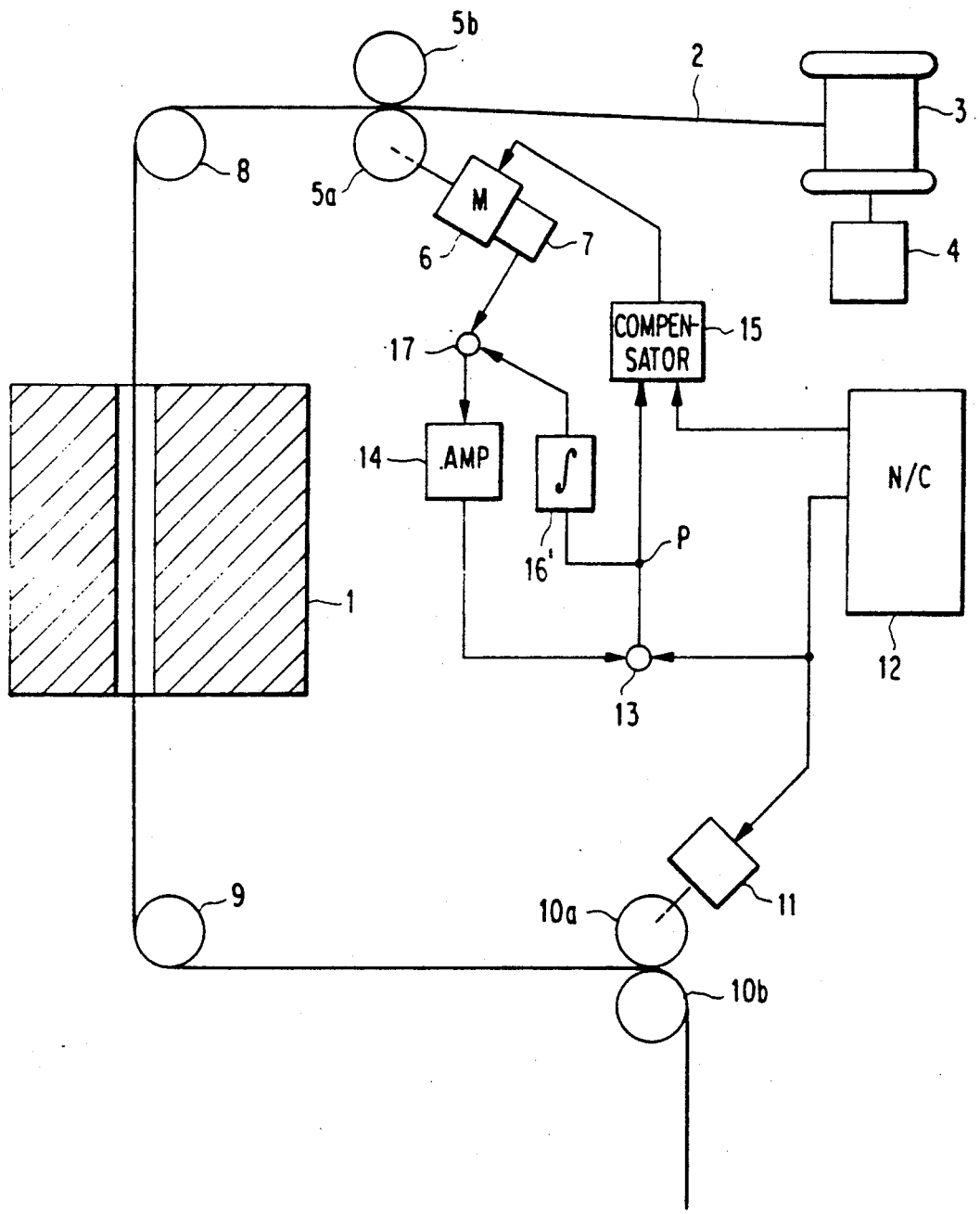
FIG. 5 is a diagram of a wirecut electrical discharge machine according to a third embodiment of the present invention.

FIG. 5 is a diagram of a wirecut electrical discharge machine according to a third embodiment of the present invention. In the third embodiment, an integrator 16' and a comparator 17 are provided instead of the filter 16 which appears in the first embodiment. The integrator 16' integrates the output of the comparator 13 and feeds back the result to the comparator 17. The comparator 17 compares the output of the tachometer 7 with the output from the integrator 16', and outputs a difference signal which is supplied to the comparator 13 through the amplifier 14.

The operation of the third embodiment will now be described below, focusing on the operation of the integrator 16'.

Figure 6:
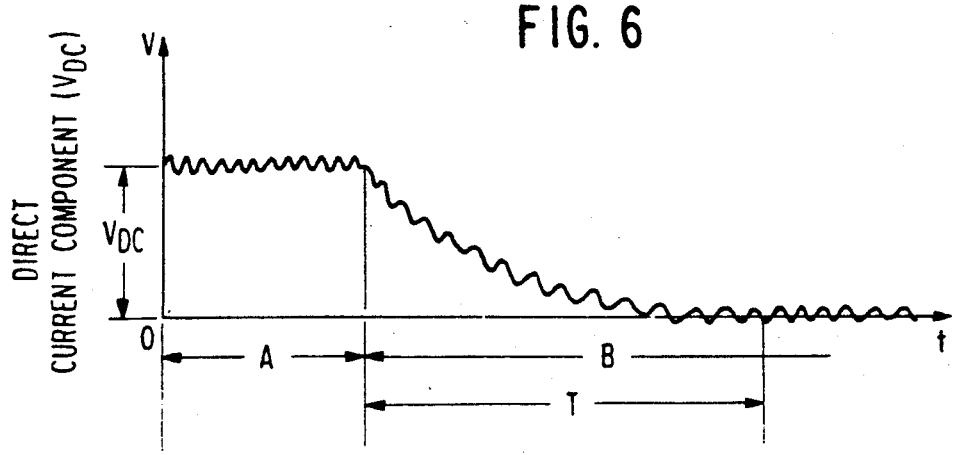
FIG. 6 is a graph illustrating operation of an integrator 16' of the third embodiment.

FIG. 6 is a graph illustrating operation of the integrator 16' of the third embodiment. FIG. 6 illustrates the operation of the integrator 16' and shows a voltage waveform at point P in FIG. 5. A time period marked A in FIG. 6 indicates a voltage waveform where there is no integrator 16', and a time period marked B indicates a voltage waveform where the integrator 16' has been inserted. Thus, the comparator 17 and the integrator 16' operate to provide negative feedback which removes the DC component from the output of the tachometer, so that the set tension of the wire electrode 2 remains unchanged.

Figure 7:
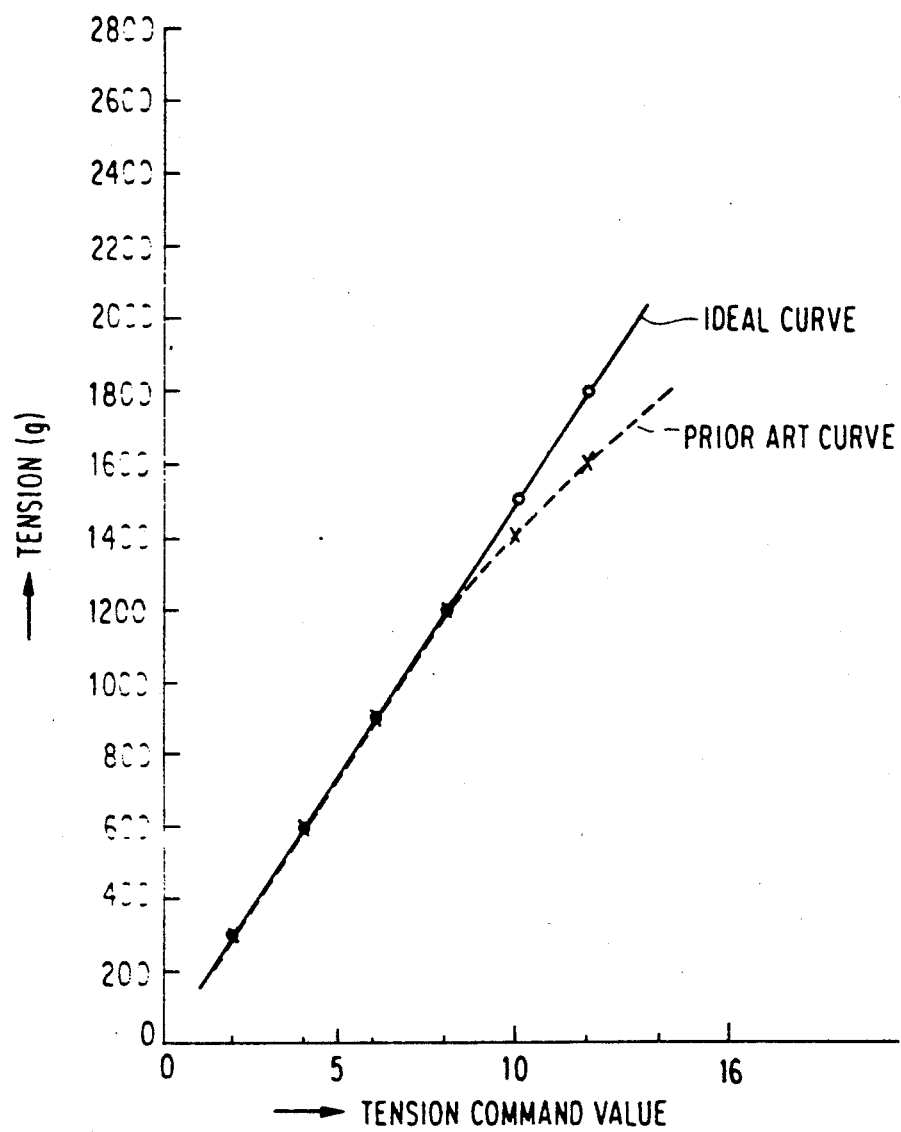
FIG. 7 is a graph illustrating a relationship between a tension command value and the tension of the wire electrode.

FIG. 7 is a graph illustrating a relationship between a tension command value and the tension of the wire electrode. The continuous line shown in FIG. 7 indicates an ideal curve and the broken line indicates a curve achieved by the conventional machine.

As clearly indicated by FIG. 7, it is understood that the tension of the wire electrode 2 changes greatly as the tension command value for the wire electrode is increased. This phenomenon will be described with reference to FIGS. 5 and 6. As the tension command value for the wire electrode 2 is increased where there is no integrator 16', the wire electrode elongates significantly, and at the same time, slip is produced between the wire electrode 2 and the brake rollers 5a and 5b in the braking section, which reduces the speed of the brake rollers 5a and 5b and generates a direct current (DC) component in the output signal of the comparator 13. The direct current (DC) component causes the variations in tension of the wire electrode 2.

On the other hand, by providing the integrator 16' and feeding back the output signal of the comparator 13 to the comparator 17 through the integrator 16', the output of the comparator 13, i.e., the speed difference signal, to be primarily controlled, is output without a DC component after a length of time equivalent to the time constant T of the integrator 16' has elapsed (see region B in FIG. 6). Hence, primary control is unaffected by setting the time constant to a much longer value than the cycle of the speed difference signal. Namely, in the graph shown in FIG. 7, the tension coincides with the ideal curve even when the tension command value for the wire electrode is increased.

As an alternative to the structural configuration of the third embodiment illustrated in FIG. 5, the output signal of the integrator 16' can be fed back at the output of the NC unit 12, instead of at the output of tachometer 7, to produce the same effect. Further, the second embodiment illustrated in FIG. 4 can be used to modify the third embodiment just as it does the first embodiment.

Figure 8:
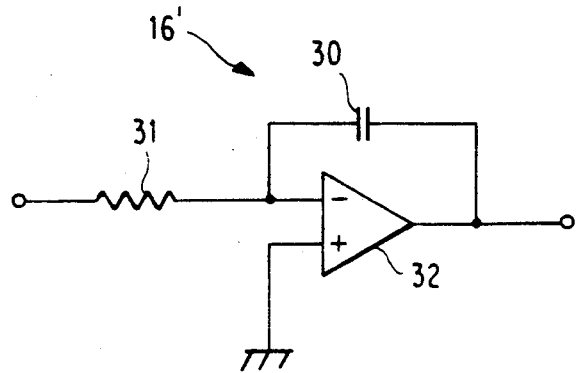
FIG. 8 is a schematic diagram illustrating an embodiment of the integrator 16'.

FIG. 8 illustrates an embodiment of the integrator 16'. The integrator 16' illustrated in FIG. 8 is a an integrator circuit which includes a capacitor 30, a resistor 31, and an operational amplifier 32.

Further, although the integrator 16' and the filter 16 which operate to remove the direct current component from the speed difference signal are shown as analog circuits in FIGS. 3 and 8, such analog circuits can be replaced by digital software processing using a digital processor (e.g., microprocessor) to produce the same effect.

It will be apparent that the invention, as described above, will achieve a wirecut electrical discharge machine which allows the tension of a wire electrode to be stabilized, thus ensuring high-accuracy machining.

Many features and advantages of the invention are apparent from the detailed specification, and thus it is intended by the appended claims to cover all such features and advantages of the invention which fall within the true spirit and scope thereof. Further, since numerous modifications and changes will readily occur to those skilled in the art, it is not desired to limit the invention to the exact construction and operation illustrated and described, and accordingly all suitable modifications and equivalents may be resorted to as falling within the scope of the invention.

What is claimed is:

1. A wirecut electrical discharge machine, comprising:
   control means for supplying a tension command and a wire electrode speed command;
   tension applying means for applying tension on a wire electrode in accordance with the tension command from said control means;
   speed detecting means for detecting speed of the wire electrode at said tension applying means;
   comparing means for comparing the wire electrode speed command from said control means with the output of said speed detecting means;
   removing means for removing a direct-current component of the output of said comparing means; and
   compensating means for compensating the tension command from said control means for said tension applying means based on the output Of said removing means.

2. A wirecut electric discharge apparatus, comprising:
   a control unit for supplying a tension command and a wire electrode speed command;
   a tension unit for applying tension on a wire electrode based on the tension command from said control unit;
   a first speed detection unit for detecting speed of the wire electrode at said tension unit;
   a first comparison unit for comparing the wire electrode speed command from said control unit with a value based on the speed of the wire electrode at said tension unit output from said first speed detection unit to produce a first comparison result; and
   a stretch compensation unit for compensating the tension command from said control unit based only on an alternating-current component of the first comparison result.

3. An apparatus as recited in claim 2, wherein said stretch compensation unit comprises:
   an adjustment unit for removing a direct-current component of the first comparison result output of said first comparison unit to produce an adjusted comparison result; and
   a first compensation unit for compensating the tension command from said control unit for said tension unit based on the adjusted comparison result of said adjustment unit.

4. An apparatus as recited in claim 3, wherein said adjustment unit comprises a high-pass filter.

5. An apparatus as recited in claim 3,
   wherein said adjustment unit comprises:
      integrating means for integrating the first comparison result to produce the adjusted comparison result; and
      a second comparison unit for comparing the speed of the wire electrode at said tension unit output from said first speed detection unit with the adjusted comparison result to produce a second comparison result, and
   wherein said first comparison unit compares the wire electrode speed command from said control unit with the second comparison result to produce the first comparison result.

6. An apparatus as recited in claim 3, wherein the value in said first comparison unit is the speed of the wire electrode at said tension unit.

7. A wirecut electric discharge apparatus, comprising:
   a control unit for supplying a tension command and a wire electrode speed command;
   a tension unit for applying tension on a wire electrode based on the tension command from said control unit;

a first speed detection unit for detecting speed of the wire electrode at said tension unit;

a pull unit for pulling the wire electrode based on the wire electrode speed command from said control unit;

a second speed detection unit for detecting speed of the wire electrode at said pull unit;

a first comparison unit for comparing the speed of the wire electrode output from said second speed detection unit with a value based on the speed of the wire electrode at said tension unit output from said first speed detection unit to produce a first comparison result; and a stretch compensation unit for compensating the tension command from said control unit based only on an alternating-current component of the first comparison result.

8. An apparatus as recited in claim 7, wherein said stretch compensation unit comprises:

an adjustment unit for removing a direct-current component of the first comparison result output of said first comparison unit to produce an adjusted comparison result; and a compensation unit for compensating the tension command from said control unit for said tension unit based on the adjusted comparison result of said adjustment unit.

9. An apparatus as recited in claim 8, wherein said adjustment unit comprises a high-pass filter.

10. An apparatus as recited in claim 8, wherein said adjustment unit comprises:

integrating means for integrating the first comparison result to produce the adjusted comparison result; and a second comparison unit for comparing the speed of the wire electrode at said tension unit output from said first speed detection unit with the adjusted comparison result to produce a second comparison result, wherein said first comparison unit compares the speed of the wire electrode output from said second speed detection unit with the second comparison result to produce the first comparison result.

11. An apparatus as recited in claim 8, wherein the value in said first comparison unit is the speed of the wire electrode at said tension unit.

12. An apparatus as recited in claim 7, wherein the value in said first comparison unit is the speed of the wire electrode at said tension unit.

13. A method for controlling tension of a wire electrode in a wirecut electric discharge apparatus, said method comprising:

(a) receiving a tension command and a wire electrode speed command;

(b) tensioning a wire electrode based on the tension command;

(c) determining the speed of the wire electrode at an upstream position which is upstream of a work area;

(d) comparing the wire electrode speed command with the speed of the wire electrode determined in step (c) to produce a first comparison result; and (e) compensating the tension command used in step (b) based only on an alternating-current component of the first comparison result.

14. A method as recited in claim 13, wherein said compensating step (e) comprises the steps of:

(e1) removing a direct-current component of the first comparison result to produce an adjusted comparison result; and (e2) compensating the tension command based on the adjusted comparison result.

15. A method as recited in claim 14, wherein said removing step (e1) comprises the step of filtering the direct-current component out of the first comparison result and retaining the alternating-current component as the adjusted comparison result.

16. A method as recited in claim 13, wherein said removing step (e1) comprises the step of integrating the first comparison result.

17. A method for controlling tension of a wire electrode in a wirecut electric discharge apparatus, said method comprising:

(a) receiving a tension command and a wire electrode speed command;

(b) applying tension on a wire electrode based on the tension command;

(c) obtaining the speed of the wire electrode at an upstream position which is upstream of a work area;

(d) pulling the wire electrode based on the wire electrode speed command;

(e) obtaining the speed of the wire electrode at a downstream position which is downstream of the work area;

(e) comparing the speed of the wire electrode at the upstream position with the speed of the wire electrode at the downstream position to produce a first comparison result; and (f) compensating the tension command used in step (b) based only on an alternating-current component of the first comparison result.

18. A method as recited in claim 17, wherein said compensating step (f) comprises the steps of:

(f1) removing a direct-current component of the first comparison result to produce an adjusted comparison result; and (f2) compensating the tension command used in step (b) based on the adjusted comparison result.

19. A method as recited in claim 18, wherein said removing step (f1) comprises the step of filtering the direct-current component out of the first comparison result and retaining the alternating-current component as the adjusted comparison result.

20. A method as recited in claim 18, wherein said removing step (f1) comprises the step of integrating the first comparison result.

* * * * *